July 10, 1934.  G. H. PFEFFERLE  1,966,202
LIQUID FILLED GASKET
Filed July 26, 1932  2 Sheets-Sheet 1

INVENTOR
George H. Pfefferle
BY
ATTORNEY

July 10, 1934.  G. H. PFEFFERLE  1,966,202
LIQUID FILLED GASKET
Filed July 26, 1932   2 Sheets-Sheet 2

INVENTOR
George H. Pfefferle
BY
Louis Prevost Whitaker
ATTORNEY

Patented July 10, 1934

1,966,202

UNITED STATES PATENT OFFICE 1,966,202

LIQUID FILLED GASKET

George H. Pfefferle, Bradford, Pa., assignor to S. R. Dresser Manufacturing Company, Bradford, Pa., a corporation of Pennsylvania Application July 26, 1932, Serial No. 624,737

5 Claims. (Cl. 285—196)

My invention consists in the novel features hereinafter described, reference being had to the accompanying drawings, which show several embodiments of the invention, selected by me for purposes of illustration, and the said invention is fully disclosed in the following description and claims.

In pipe couplings, repair clamps, sleeves, and like pressure retaining devices, it is customary to use packing gaskets composed of elastic material such as rubber, or rubber compound, which are confined between relatively movable, unyielding surfaces. The degree of pressure, as pipe line pressure, for example, which such a gasket will hold without leakage, depends upon the pressure exerted at the surface of the gasket, against the confining surface. If this pressure is equal to or greater than the line pressure, there will be no leakage. If it is less at any point accessible to the line fluid, the latter will leak past the gasket and escape. On account of surface variations of the confining members, the surface pressure at different points around the gasket varies, and the efficiency of the coupling or repair device will be no greater than that at its point of lowest pressure.

In an endeavor to secure an approximate equality of pressure between the gasket surfaces and the surfaces of the confining members, it has been customary to employ a gasket of comparatively large cross sectional area, which under pressure permits, to a limited extent, the displacement or partial deformation of the rubber to points of lower pressure, but this result is not entirely satisfactory, since the rubber, or rubber compound, offers very considerable resistance to "cold flow".

According to my present invention, I form the gasket hollow and hermetically sealed, the interior space being completely filled with a liquid contained in a space, or spaces, extending substantially entirely, or entirely, around the same, and so constructed that pressure applied to the exterior walls of the gasket will be transmitted by the enclosed liquid substantially equally to all portions of the surface of the gasket in contact with the unyielding confining surfaces, regardless of surface irregularities or other factors tending otherwise to cause variations in pressure. In some instances a compressible liquid, as an aerated liquid, may be employed, where a slight cold flow of the gasket or slight relative movement of the confining surfaces might otherwise effect a considerable reduction of pressure. Ordinarily, however, the gasket will be filled with a substantially non-compressible liquid, as water for example, or any other suitable liquid which will not have an injurious effect on the rubber.

In the case of gaskets for pipe couplings, which are ordinarily made in complete ring form, the space or spaces containing liquid may, and ordinarily do, extend entirely around the gasket parallel with the periphery. In the case of gaskets for application to pipes already laid in a line, as leak clamps for bell and spigot joints, split sleeves and other leak repair devices, the gasket must have meeting ends to permit it to be placed around the pipe, and it is frequently necessary to cut portions from one of the meeting ends to make the gasket exactly fit the pipe when the meeting ends are brought together. In such gaskets as made in accordance with my invention, the liquid space terminates in a solid portion adjacent to each of the meeting ends, which solid portions may be formed integrally, or by inserting a rubber plug in the end of the liquid space and cementing it or vulcanizing it in place, and at least one of the solid end portions may be made of sufficient length to permit a portion to be cut off in fitting the gasket to the pipe. The liquid may be introduced in the gasket before such a plug is inserted, or it may be inserted in any form of the gasket through an aperture or apertures which are thereafter plugged with rubber and cemented or vulcanized. In all cases the liquid is hermetically sealed within the gasket and no protruding part is left, so that the gasket can be substantially enclosed within the surfaces of the confining members.

Ordinarily the gaskets will be exposed to pressure throughout their entire extent by the use of an annular clamping ring and bolts, but in some instances the confining members may be provided with means for applying pressure locally to portions of the gasket which will increase the pressure on the contained liquid and distribute the increased pressure substantially uniformly throughout their entire extent.

In actual practice, it is found that in using my improved gaskets, the enclosed liquid being perfectly mobile offers practically no resistance to displacement and exerts an absolutely uniform pressure on the inner surfaces of the walls of the gasket, with the result that the pressure which the outer surfaces of the gasket walls exert on the confining surfaces, while perhaps not absolutely uniform, is substantially uniform and much more nearly uniform than can possibly be obtained with a solid gasket.

Referring to the drawings.

Figure 1:
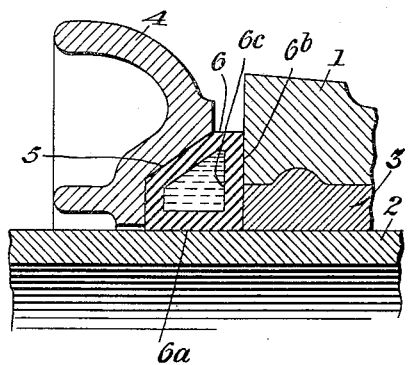
Fig. 1 is a partial sectional view of a clamp for bell and spigot joint provided with a gasket embodying my invention.

In Fig. 1 I have shown, in section, one of my improved gaskets of a form suitable for use with a clamp for bell and spigot joints, the clamping ring of which is indicated in the drawings. In Fig. 1, 1 represents a portion of the bell end, and 2, represents a portion of the spigot end of a bell and spigot joint, and 3, represents the solid packing. 4, represents the clamping ring of the clamp, provided with a packing recess, 5, which receives the gasket. The usual bull ring and clamping bolts of the clamp are not shown as the particulars of the clamp form no part of my invention.

Figure 2:
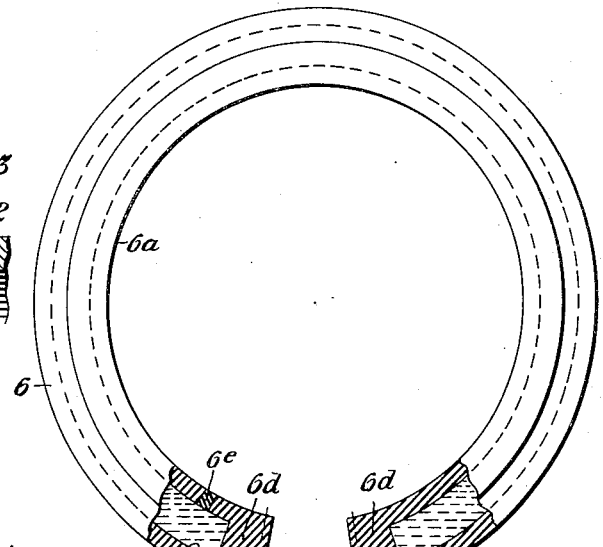
Fig. 2 is a plan view, partly in section, of a gasket shown in Fig. 1, with the meeting ends in separated relation.

6 represents the clamp gasket, formed of vulcanized rubber, or rubber composition, which is provided with a cylindrical face, 6a, to engage the spigot face, 6b, to fit against the face of the bell and the solid packing, and with faces to engage the packing recess, 5, in the clamping ring. The gasket, 6, is provided with meeting ends so that it can be placed around the spigot without disturbing the joint. The gasket, 6, is formed hollow, as shown in Fig. 1, and contains the liquid chamber, indicated at 6c, the walls of which are preferably substantially parallel with the exterior surfaces of the gasket, as shown in Fig. 1, although this is not essential. In order to close the chamber, 6c, the meeting ends of the gasket are provided with transversely extending closing walls, disposed radially, to form a butt joint, as shown in Fig. 2 (or angularly to form a lap joint if preferred). The gasket is therefore solid for the full cross section of the gasket at the points adjacent to the transverse walls, and the walls, 6d, 6d, may be made of sufficient thickness so that a solid piece may be cut off at either or both ends of the gasket, as indicated in dotted lines in Fig. 2, if necessary, in order to make the gasket of the required length to fit around the spigot, without interfering with the chamber, 6c.

The chamber, 6c, is filled with a liquid, as indicated in the drawings, and the gasket may be formed and the liquid inserted and hermetically sealed within the chamber, 6c, in any desired manner, for example, in some instances the gasket may be molded and filled with the liquid, and then placed in a mold and vulcanized, or the gasket may be molded and vulcanized, and the liquid introduced thereafter through a small hole, as indicated, which is afterwards closed by a plug of rubber, cemented or vulcanized in place, as indicated at 6e, in Fig. 2. The liquid may be a substantially non-compressible liquid as water, for example, or any other liquid, whether compressible or non-compressible, which will not injure the rubber. Where a compressible liquid is desired, I employ, for example, an aerated liquid.

Figure 3:
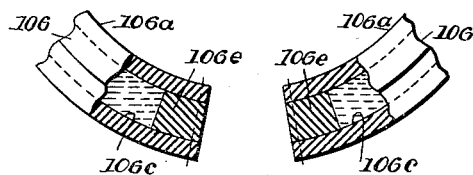
Fig. 3 is a fragmentary sectional view of the meeting ends of a gasket showing a slightly modified construction.

In some instances the gasket where not endless, may be formed as shown in Fig. 3, in which the corresponding parts to those shown in Figs. 1 and 2, are indicated by like numerals with the addition of 100. In this instance, the gasket, 106, is formed as a hollow tubular part, by extruding it or otherwise, and the chamber, 106c, is closed at each end by a plug, 106e, vulcanized or cemented therein to hermetically seal the liquid contents therein. In such case either or both of the plugs, 106e, may be made of sufficient length to permit of cutting off one or both ends, as indicated in dotted lines in Fig. 3, to make the gasket of the desired length to fit the pipe around which it is placed.

Figure 4:
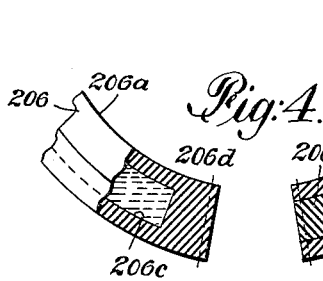
Fig. 4 is a similar view showing another modification.

In some instances, as indicated for example, in Fig. 4, in which the parts corresponding with those shown in Figs. 1 and 2 are given the same numerals with the addition of 200, the gasket, 206, may be provided at one end with a solid end wall, 206d, and at the other end with a plug, 206e, closing the opening at the other end of the chamber, 206c, through which opening the contained liquid can be readily inserted. Obviously the gasket illustrated in Figs. 1 to 4 may be made in different cross sections to conform to the shape of the packing engaging portions of the clamping rings with which they are used.

It will be understood that in the use of gaskets such as shown in Figs. 1 to 4, inclusive, compressive force is exerted upon the gasket by the clamping bolts and ring to force outer faces of the gasket into sealing engagement with the spigot and with the face of the bell and the solid packing. It will be seen that the force exerted on the gasket will be transmitted by the liquid substantially uniformly throughout the extent of the gasket to the inner faces of the gasket walls in proximity to the bell and spigot, and that the outer faces of said walls in contact with the bell and spigot will thus be held in sealing engagement therewith, with substantially uniform pressure throughout, regardless of surface irregularities, or variations of thickness throughout the walls. Other difficulties which cause lack of uniform sealing engagement where solid gaskets are employed, such as variations in the thickness or density of different portions of the gasket, unequal bolt strain, on different portions of the clamping ring, for example, will be entirely avoided by my improved gasket, as whatever pressure is applied to any portions of the gasket will be distributed substantially uniformly to all parts of the sealing surfaces through the hermetically sealed liquid contents.

Figure 5:
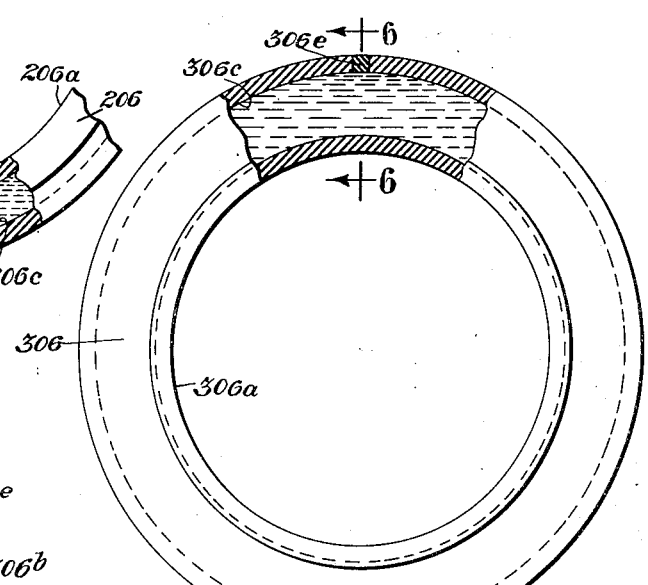
Fig. 5 is a plan view, partly in section, of an endless gasket for pipe couplings embodying my invention.
Figure 6:
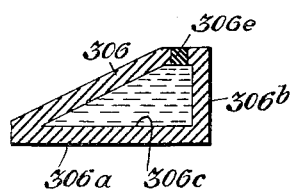
Fig. 6 is a sectional view on line 6—6 of Fig. 5.

In forming a gasket for pipe couplings, it will preferably be made endless, as it can be slipped over the pipe, and, of the desired cross section, and provided with an interior chamber extending entirely around the gasket, and filled with liquid hermetically sealed therein. Such a gasket is illustrated in Figs. 5 and 6, in which the parts corresponding with those in Figs. 1 and 2 are given the same numerals with the addition of 300. Thus, 306, is the gasket which is annular and provided with the chamber, 306c, extending continuously around the same, and filled with liquid hermetically sealed therein. This type of gasket may have any desired cross section, according to the form of the parts with which it is to be used and may be made in any desired way. For example, the gasket may be formed by extruding it in tubular form, uniting the ends, and placing it in a mold and vulcanizing it. The liquid, either compressible or non-compressible, may be inserted before the ends of the tube are joined, and the gasket vulcanized, or it may be inserted after vulcanization by making a suitable aperture, which is closed by a plug, as indicated at 306e.

It will be understood that pressure will be applied to the walls of the gasket, by clamping rings and bolts, or other retaining parts of the coupling, and that the pressure will be transmitted with substantially complete uniformity through the liquid to the portions of the gasket in contact with the pipe.

Figure 8:
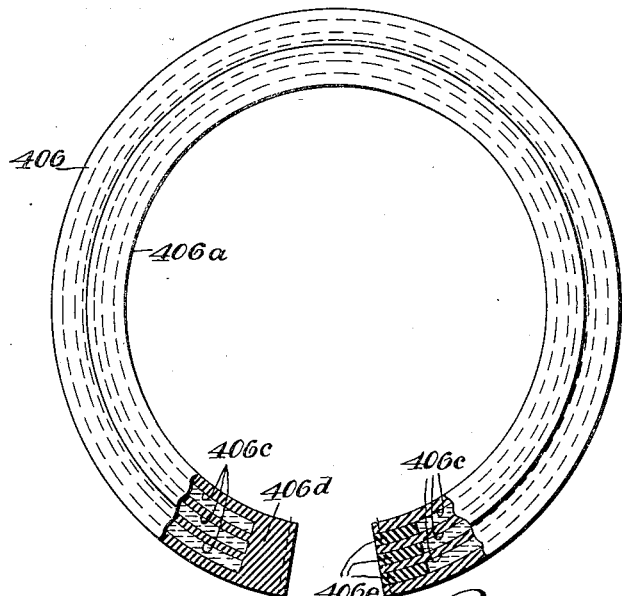
Fig. 8 is a fragmentary sectional view of the meeting ends of the gasket shown in Fig. 7, in separated relation.
Figure 7:
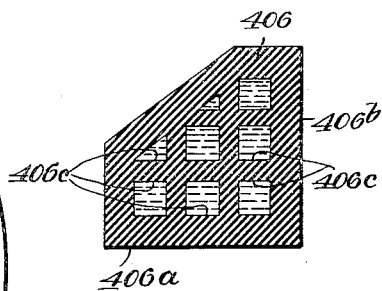
Fig. 7 is a sectional view of a modified form of gasket having plural chambers filled with liquid.

My invention also contemplates the formation of a gasket containing plural chambers which may extend all the way around or part way around the same, and which are filled with either compressible or non-compressible liquid, hermetically sealed therein. Thus, in Figs. 7 and 8, in which the parts corresponding with those shown in Figs. 1 and 2 are given the same numerals with the addition of 400, the gasket, 406, which is in this instance shown as constructed for use in a bell and spigot joint, is provided with a plurality of chambers, 406c, extending from one end of the gasket to the other. In this instance the chambers are closed at one end by an integral transverse wall indicated at 406d, while at the other end the individual chambers are hermetically sealed after filling them with liquid, by rubber plugs, 406e, cemented or vulcanized therein. Obviously the gasket may be provided with two or any larger number of chambers, and the gasket may have any desired form, and the chambers may be endless as in Figs. 5 and 6, or provided with meeting ends of the forms shown in Figs. 2, 3, 4 or otherwise. Where the gasket is formed with meeting portions, the solid end portions, 406d, or plugs, 406e, or both, may be made long enough to permit portions to be cut off from one or both ends to fit the gasket.

In using my improved gasket it is not necessary that the extraneous pressure should be applied to it entirely around the gasket as is usual in pipe couplings of the well known "Dresser" type, or in pipe clamps and the like. On the contrary, the pressure may be applied at one point or at a plurality of separated points, if the gasket is otherwise enclosed within unyielding surfaces.

Figure 9:
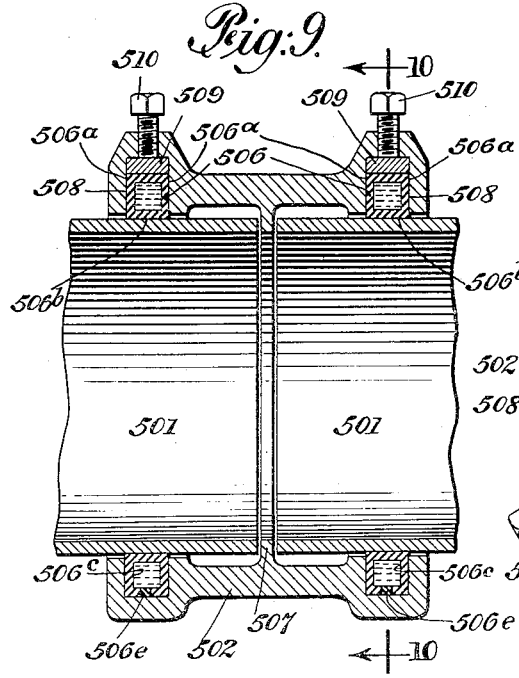
Fig. 9 is a sectional view of a pipe coupling for plain end pipes embodying my invention.
Figure 10:
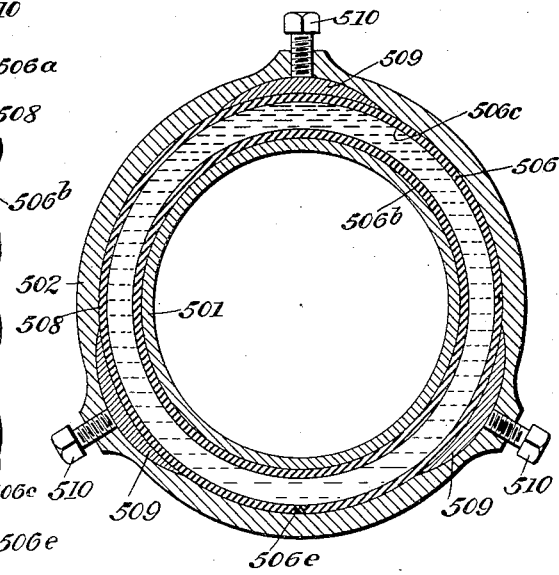
Fig. 10 is a transverse section on line 10—10 of Fig. 9.

In Figs. 9 and 10 for example, in which the parts corresponding with those of Figs. 1 and 2 are given the same numerals with the addition of 500, plain end pipe sections, indicated at 501, 501, have their ends inserted within a coupling sleeve, indicated at 502, provided with a centering stop, 507, and having at each end an annular gasket receiving recess, 508, open adjacent to the pipe section which it surrounds. In each recess is an annular gasket, 506, in this instance of rectangular cross section, and provided with lateral faces, 506a, to engage the walls of the recess, and a cylindrical surface, 506b, to engage the pipe. The gasket is provided with the hermetically sealed chamber, 506c, filled with compressible or non-compressible liquid.

Each of the annular recesses, 508, is provided with one or more radially movable shoes, indicated at 509, three being shown at equally spaced intervals, although a greater or smaller number may be employed. Each shoe is provided with a compressing screw, 510, extending through a threaded aperture in the sleeve and engaging the shoe, so as to force the shoe inwardly as the screw is turned up. The shoe or shoes lie between the outer face of the liquid filled gasket, and the bottom of the recess, as shown. When the parts of the coupling are assembled, if the screw or screws, 510, are turned up, the sleeve or sleeves will exert pressure on the gasket, which is held against lateral expansion between the walls of the recess. The pressure will therefore be transmitted and substantially uniformly distributed by the liquid to the inner face of the gasket wall in contact with the pipe, thus forcing the face, 506b, of the gasket into sealing engagement with the pipe with substantially uniform pressure throughout its entire extent, whether the pressure is applied at one point or at a plurality of points on the exterior of the gasket. Any desired sealing pressure can be obtained by employing a desired number of shoes and clamping screws.

I am aware that it has been proposed to employ a hollow gasket for pipe couplings into which a liquid may be forced, the entire sealing effect being dependent upon the force exerted exteriorly upon the liquid to force it into the gasket. Such devices have not been successful, and moreover the requirement for an external connection capable of being closed or plugged, after a predetermined liquid pressure, has been obtained, renders such a device impractical with ordinary couplings or pipe clamps, in which the gaskets are substantially wholly enclosed.

On the contrary, according to my invention, the gasket is provided with a hermetically sealed chamber or chambers, filled with liquid not normally under pressure, that is to say at the same pressure as the atmosphere, the liquid serving to uniformly distribute pressure applied to it mechanically by any of the usual means used in relation to pipe clamps, couplings, or the like, to the end that the mechanically exerted pressure, whether uniformly or non-uniformly applied to the gasket shall be substantially uniformly distributed upon all points in the face or faces of the gasket to be held in sealing engagement with confining surfaces. This subject matter I believe to be entirely new.

It will be understood that the hollow gasket filled with liquid permanently and hermetically sealed within the liquid chamber or chambers thereof, constitutes a new article of manufacture which can be manufactured in the different sizes and shapes required and shipped to points of distribution and use, and carried in stock and otherwise held ready for instant use like any other form of gasket.

What I claim and desire to secure by Letters Patent is:

1. As a new article of manufacture, an annular rubber pipe gasket having meeting ends, said gasket being provided with a hermetically sealed interior chamber extending substantially continuously from one of said meeting ends to the other and filled with liquid, said chamber being closed at each end by solid portions permanently united to the walls of said chamber, the said solid portions at at least one of said meeting ends of the gasket being of sufficient length to permit a portion thereof to be cut off parallel to the end meeting face thereof to form a new end meeting face and decrease the diameter of the gasket, without opening said chamber.

2. As a new article of manufacture, an annular rubber pipe gasket having meeting ends, said gasket being provided with a hermetically sealed interior chamber extending substantially continuously from one end to the other and filled with liquid, said chamber being closed at one end by a solid portion integral with said gasket and at the other end with a solid plug of rubber permanently secured in said gasket, the said solid portions at at least one end of the gasket being of sufficient length to permit a portion thereof to be cut off to fit the gasket, for use without opening said chamber.

3. In a pipe joint, the combination with gasket retaining surfaces, including surfaces to be sealingly engaged by the gasket and oppositely disposed relatively movable pressure applying surfaces, of a substantially annular gasket within said retaining surfaces, provided with a hermetically sealed chamber extending substantially entirely around the gasket, and filled with liquid, said liquid serving to uniformly distribute to all parts of the sealing surfaces of the gasket, the pressure applied to the gasket by said pressure applying surfaces, said gasket including a thickened portion of sufficient depth to permit trimming whereby the gasket may be fitted without opening the sealed chamber.

4. In a pipe joint, the combination with gasket retaining surfaces, including surfaces to be sealingly engaged by the gasket and oppositely disposed relatively movable pressure applying surfaces, of less extent annularly than the contiguous gasket surface, of a gasket within said retaining surfaces provided with a hermetically sealed chamber extending substantially entirely around the same, and filled with liquid at substantially atmospheric pressure, said liquid serving to distribute substantially uniformly to all parts of the sealing surfaces of the gasket, pressure applied at any point on the gasket by said pressure applying surfaces.

5. In a pipe joint, the combination with gasket retaining surfaces, including surfaces to be sealingly engaged by the gasket and oppositely disposed relatively movable pressure applying surfaces engaging the gasket at separated points, of a gasket within said retaining surfaces provided with a hermetically sealed chamber extending substantially entirely around the gasket and filled with liquid at substantially atmospheric pressure, said liquid serving to distribute substantially uniformly to all points in the sealing surfaces of the gasket, pressure applied at said separated points on the gasket by said pressure applying means.

GEORGE H. PFEFFERLE.